Patented Mar. 20, 1945

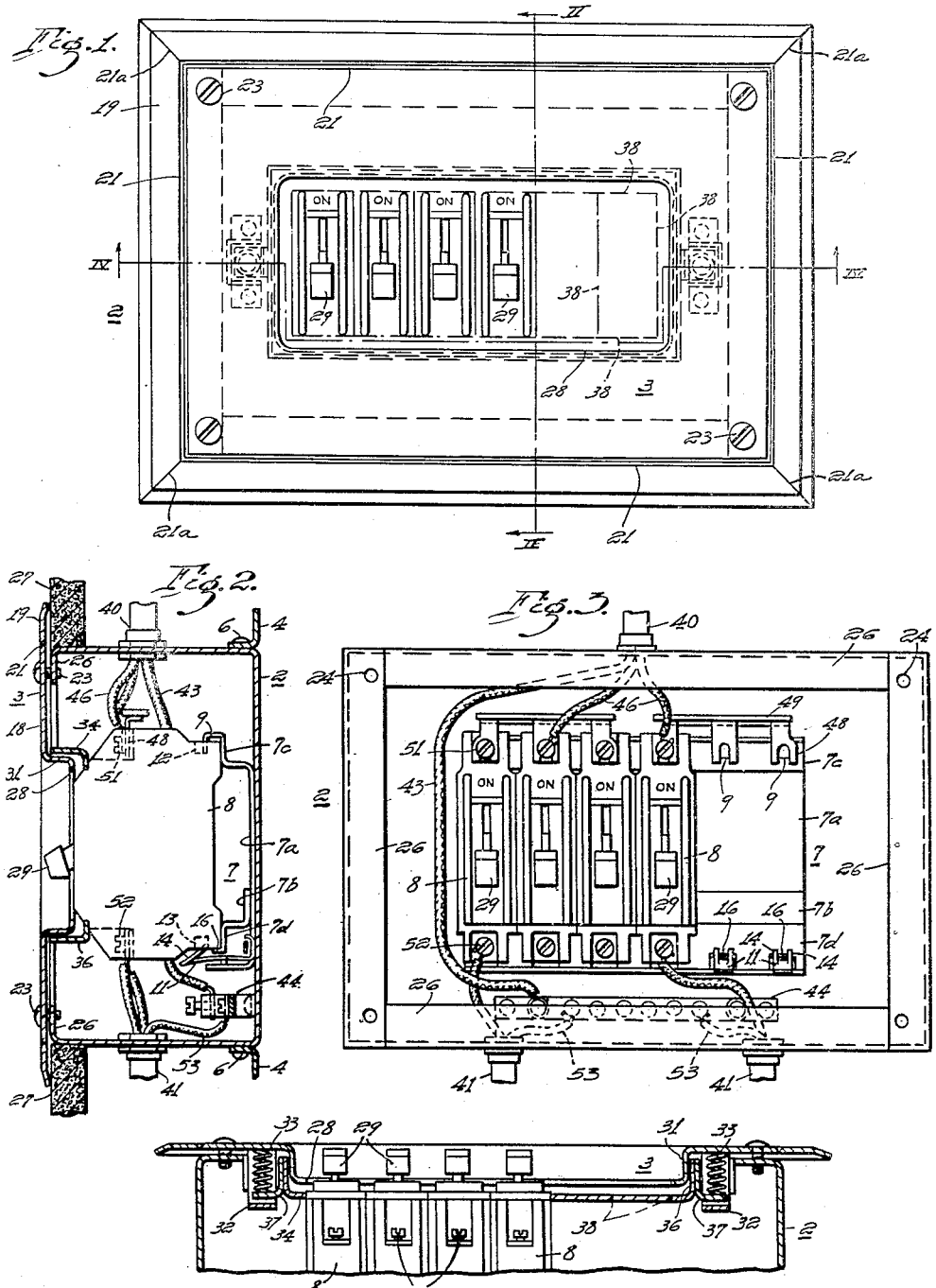

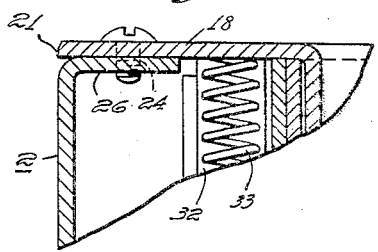
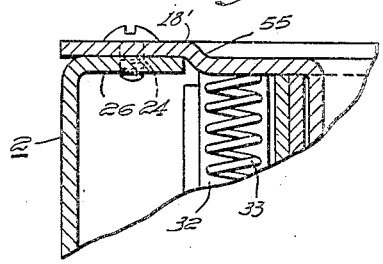
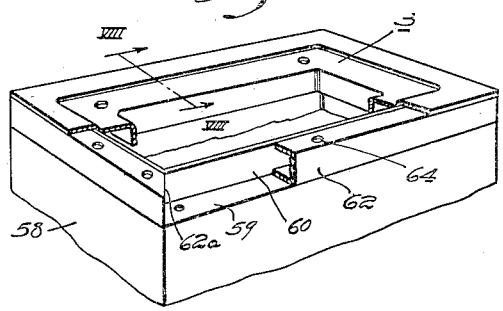
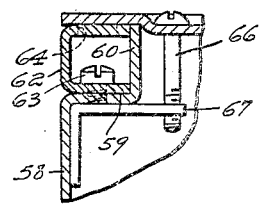
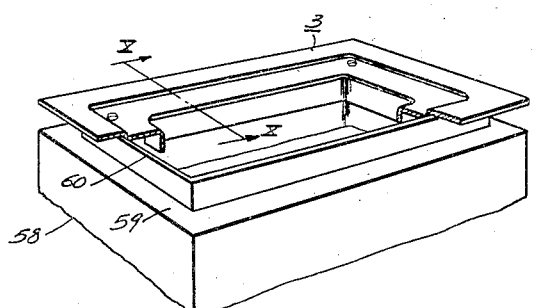
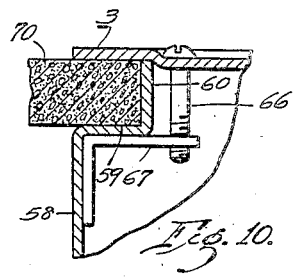
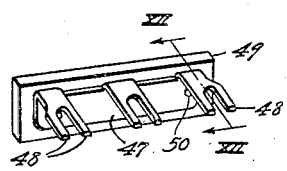

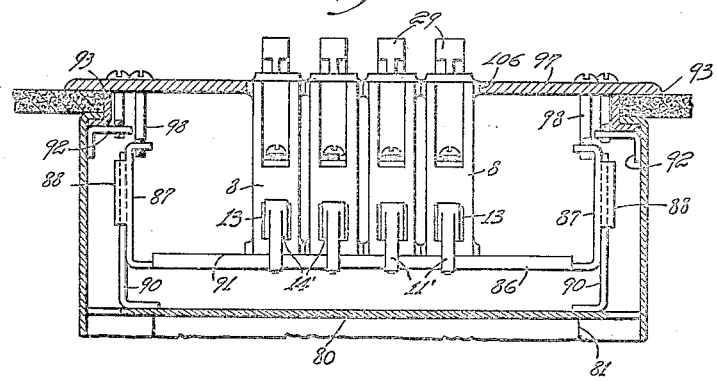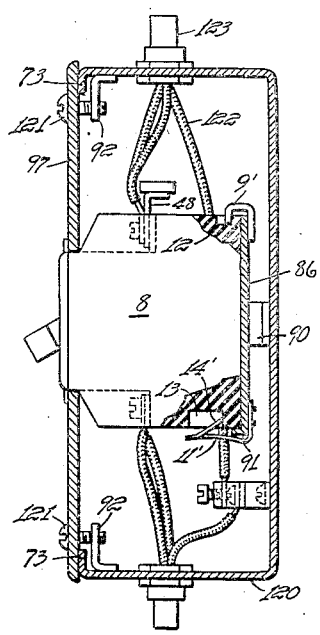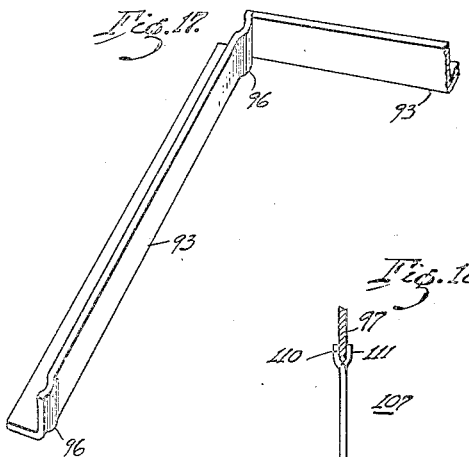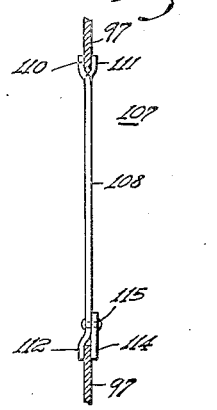

2,372,083

UNITED STATES PATENT OFFICE 2,372,083

EQUIPMENT FOR ELECTRICAL INSTALLATIONS

Ernest G. Johansson, Belmont, Mass., and Arthur A. Young, Manchester, N. H., assignors to Anchor Manufacturing Company, Boston, Mass., a corporation of Massachusetts Application December 5, 1941, Serial No. 421,786

4 Claims. (Cl. 174—57)

The present invention relates to equipment for housing electrical apparatus such as circuit breakers and the like. It has particular relation to a receptacle which is suitable for either flush or projection mounting and includes means for detachably securing therein a plurality of interrupting devices for controlling individual load circuits.

The copending patent applications of Harry P. Sparkes, Serial Nos. 407,453, which became Patent 2,323,252, issued June 29, 1943, and 407,454, filed August 19, 1941 relate broadly to electrical service and load center installations which are readily adaptable to handle the various changes in load requirements which have been so troublesome and expensive to consumers in the past. In order to accomplish this, the equipment disclosed in these applications is designed so that an adjustable number of circuit controlling devices are secured in a receptacle in a readily attachable and detachable manner. The present invention relates to features which have been found particularly advantageous when used with the constructions of the aforesaid applications although it will appear to those skilled in the art that they are by no means limited to such use.

Installations of the type in question are frequently made with the supporting receptacle disposed within a wall structure so that its cover is flush with the outer wall surface, while at other times it is necessary to support the receptacle in a position projecting from the wall. The present invention provides a receptacle and cover assembly which is readily adaptable for either type of mounting and the cover is further designed to properly engage the circuit controlling devices to close the space thereabout irrespective of variations which may occur in the spacing therebetween. The opening in the cover may also be adjusted in size to accommodate the selected number of devices in the receptacle.

In a preferred form of the invention, the cover comprises a main or front portion having an opening large enough to permit access to the operating handles of the maximum number of circuit breakers or controlling devices which the receptacle will house. An auxiliary panel, having an opening adjustable in size, is resiliently supported from said front portion in biased engagement with the fronts of the breakers about their operating handles. Forwardly extending perimetral flange portions are provided about the openings in the two cover portions to insure that no opening is left therebetween.

Other important features of the present invention include a novel spring clamping arrangement for individually securing the breakers in the receptacle in a readily attachable and detachable manner and contact fingers normally disposed at the location of the breaker terminals for rapid attachment thereto. The fingers are preferably supported from a strip of insulating material to prevent other conductors resting directly on the conducting material.

It is accordingly an object of the invention to provide an electrical receptacle assembly which is readily adaptable for use in flush or projection mounted installations.

Another object of the invention is to provide a novel self-adjusting cover structure for an electrical receptacle.

Still another object of the invention is to provide a novel and improved arrangement for securing an adjustable number of circuit controlling devices in position within a receptacle.

A further object of the invention is to provide a readily attachable and detachable contact making arrangement for use in a receptacle adapted to accommodate an adjustable number of circuit controlling devices.

Other objects and advantages of the invention will appear from the following detailed description read in connection with the accompanying drawings, in which:

Figure 1 is a front elevational view of a preferred embodiment of the present invention in an electrical load center installation.

Fig. 2 is a vertical sectional view taken along the line II—II of Fig. 1;

Fig. 3 is an elevational view of the apparatus of Fig. 1 with the front cover removed;

Fig. 4 is a horizontal sectional view of a portion of the apparatus taken along the line IV—IV of Fig. 1;

Fig. 5 is an enlarged horizontal sectional view of a portion of apparatus similar to Fig. 1 arranged for a projection mounted installation with the outer perimetral portion of the cover removed;

Fig. 6 is a view similar to Fig. 5 showing a modified cover construction;

Fig. 7 is a perspective view of the front portion of a modified receptacle construction suitable for either flush or projection mounting;

Fig. 8 is an enlarged vertical sectional view of a portion of the apparatus of Fig. 7 taken along the line VIII—VIII thereof;

Fig. 9 is a perspective view of the apparatus of Fig. 7 adapted for flush mounting;

Fig. 10 is an enlarged vertical sectional view of a portion of the apparatus of Fig. 9 taken along the line X—X thereof;

Fig. 11 is a perspective view of the contact members shown in Figs. 2 and 3;

Fig. 12 is a sectional view taken along the line XII—XII of Fig. 11;

Fig. 15 is a horizontal sectional view taken along the line XV—XV of Fig. 13 with the meter engaging portion of the apparatus broken away;

Fig. 16 is a vertical sectional view of a receptacle similar to that of Fig. 15 adapted for a projection mounting installation;

Fig. 17 is a perspective view of the angle members employed to adapt the receptacle of Figs. 14 and 15 for flush mounting; and Fig. 18 is an enlarged vertical sectional view of a portion of the apparatus taken along the line XVIII—XVIII of Fig. 13 to show the construction of a panel for closing the cover.

Figure 13:
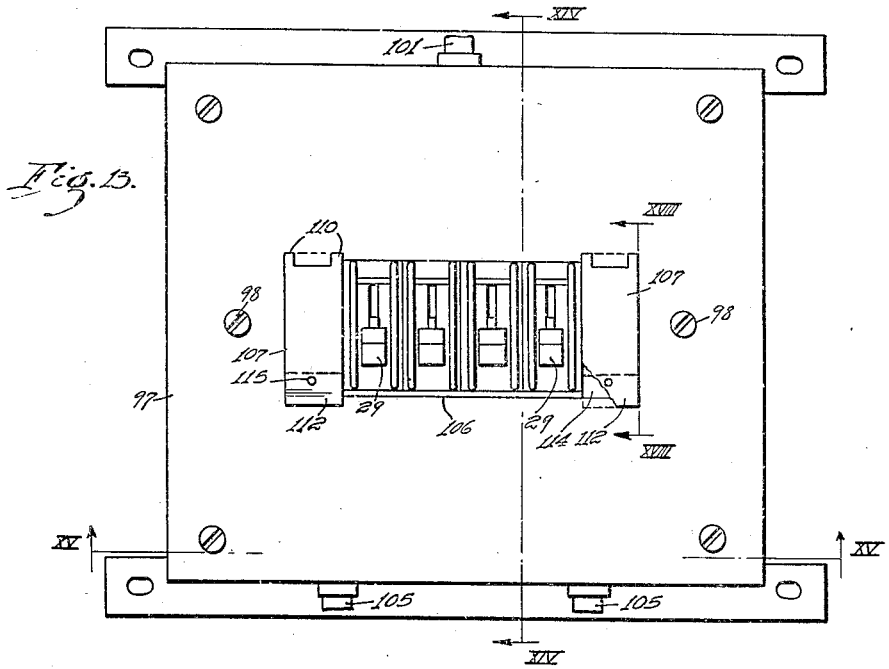
Fig. 13 is a front elevational view of a modified form of the invention.

Referring particularly to Figs. 1, 2, 3 and 4 of the drawings, the apparatus includes an open front receptacle 2 which is preferably formed of sheet metal or the like. The open front of this receptacle is adapted to be closed by a cover member designated generally as 3, and angle members 4 may be attached to the top and bottom thereof by means of machine screws 6 to facilitate attachment to supporting studs or portions of a wall.

Secured within the receptacle by any suitable means such as welding to the rear thereof, for example, is a circuit breaker clamping structure designated generally as 7. This structure is designed to individually engage circuit breakers 8 or the like in a readily attachable and detachable manner so that up to a predetermined number of such breakers may be disposed in the receptacle in side by side relationship. It includes a first transverse metal strap 7a secured to the receptacle by welding or some other suitable means and a lower strap 7b secured thereto in a similar manner. These straps are forwardly offset at 7c and 7d respectively to form a supporting base for the breakers.

Rigid clamping fingers 9 are formed in spaced relationship along the upper strap 7a to fit within a notch 12 in the upper surface of a corresponding breaker 8. In addition, a lower clamping finger 11 is disposed in vertical alignment with each upper finger for engagement with a notch 13 in the bottom of the breaker 8 opposite the notch 12. These latter fingers are preferably of resilient construction and each includes edge portions 14 bent inwardly at an angle to be engaged by the lower surface of a breaker when it is thrust into position against the supporting base 7c—7d. When a breaker is thus thrust into this position about one of the fingers 9 as a pivot, a cam action results pushing the corresponding finger portions 14 out of the way of the breaker until it comes into engagement with the notch 13. A breaker may be removed in a similarly convenient manner by forcing the edge portions out of the notch 13 and reversing the above operation.

At spaced positions in substantial alignment with the clamping fingers, the lower strap is slit to provide a forwardly extending lip or stop member 16. These stop members are designed to engage the lower bottom portion of breakers in attached positions against the base 7c—7d to furnish vertical support thereto. In this manner the fingers 11 are not required to support the weight of the breakers and need only bias them inwardly against the vertical base.

The cover includes a main central portion 18 and an outer perimetral portion 19 which may be formed integrally therewith but separated therefrom by lines 21 weakened by forming grooves or slits therealong in the manner of the well known "knock out." In addition the outer portion may be further weakened across the corners as at 21a to facilitate its removal from the main portion. As shown in Figs. 1, 2 and 4, the receptacle is flush mounted within a wall and the cover is secured thereto by means of machine screws 23 extending therethrough into engagement with screw threaded holes 24 in an inwardly extending front perimetral portion 26 of the receptacle. The central portion 18 of the cover is of such a size that it engages this portion of the receptacle in a projection mounted installation to cover its open front. In a flush mounted installation as shown in Fig. 2, however, the outer perimetral portion 19 of the cover is adapted to engage the outer surface of a wall 27.

The central portion 18 of the cover is provided with an opening 28 in alignment with the front portions of the circuit breakers 8 to permit access to operating handles 29 of the maximum number of such breakers that the apparatus will accommodate. This opening is surrounded by an inwardly offset portion 31 which is substantially perpendicular to the main cover surface. In addition a pair of brackets or supporting members 32 are disposed inside the portion 18 of the cover on opposite sides of the opening to support helical springs 33. An auxiliary cover panel 34 including a perimetral flange portion 36 telescopically fitting outside the portion 31 of the cover is resiliently biased away from the cover itself by angles 37 fitting against the springs 33 within the bracket members 32 which limit the biased movement. Although some other adjustable opening arrangement might be employed as hereinafter set forth, the auxiliary cover panel is preferably weakened along lines 38 by forming slits or grooves to provide a plurality of knockouts each of which is in alignment with the front of a circuit breaker in each position provided within the receptacle. As shown by way of example in Figs. 1 to 4, the apparatus is designed to accommodate up to six breakers with four actually in place. Thus the corresponding four "knockout" portions of the auxiliary cover panel are removed and the springs 33 bias it against the breakers to close the opening thereabout. This resilient supporting arrangement insures that the auxiliary cover panel will engage the breakers despite variations in the main cover position which may arise between different flush mounted installations and between flush and projection mounted installations. In addition, the adjustable cooperation between the offset or flange portions 31 and 36 prevent any undesired openings between the main cover 3 and the auxiliary panel 34. While it is preferred that the auxiliary panel be supported from the cover it may in some cases be desirable to support it resiliently from the front of the receptacle instead. Such a modification is clearly within the scope of this invention.

It will be understood that the receptacle is preferably provided with usual conduit receiving "knockouts" on its sides, rear etc., as desired. By way of example in the drawings there is shown an upper conduit 40 carrying the incoming power lines into the top of the receptacle and a pair of conduits 41 for carrying the load circuit conductors into the bottom thereof. The incoming power conductors may comprise a three wire distribution system and include a ground wire 43 electrically connected to a ground conducting strip 44 in the bottom of the receptacle and a pair of ungrounded conductors 46.

A connecting member, which is also shown in Figs. 11 and 12 includes a conducting strip 47 having a plurality of flexible conducting fingers 48 extending therefrom in substantially perpendicular relationship thereto. Each conducting strip is supported upon a fibre or insulator strap 49 by means of countersunk rivets 50. While the member is shown by way of example as including three conducting fingers it will be understood that this number may be varied within the scope of the invention and that a plurality of conducting strips may be secured to a single fibre strap in insulated relationship. The insulating strap 49 preferably projects past the edges of the strip 47 on all sides as shown in Figs. 11 and 12.

Referring particularly to Figs. 2 and 3 of the drawings, each of the circuit breakers 8 includes upper and lower electrical terminals 51 and 52, respectively, and the connecting members are disposed within the receptacle for engagement with the upper terminals of the breakers. To this end one of the line conductors 46 is electrically connected to the terminal 51 of one of the first three breakers along with the corresponding conducting finger 48 while the other conductor is similarly connected to the other conducting strip and the terminal 51 of the other breaker in a similar manner. In this construction, each of the connecting members is held in place by engagement of one of its fingers 48 with one of the breaker terminals 51 so that the remaining connecting fingers 48 are disposed in the proper position for ready engagement and disengagement with additional breakers. Since the fingers are resilient and engage the breaker terminals adjacent the rigid clamping finger, each of them may be brought into proper engagement with the associated breaker terminal at the time the finger 9 is inserted into the notch 12. The breaker may then be thrust into final clamped position through a pivotal movement about the rigid clamping finger without displacing the parts from the desired connecting position. The flexible construction of the conducting fingers likewise permits the individual insertion or removal of a breaker without it being necessary to interfere with the connection to other breakers energized through the same connecting member. As is best shown in Fig. 3, the insulating strips 49 of the two connecting members form an insulating barrier for the upper breaker terminals, the conducting strips 47 and the contact fingers 48.

Ground wires 53 of the circuit leads are connected directly to the ground strip 44 while the other circuit conductors are individually connected to the lower terminals 52 of the breakers which are to control their continuity.

As previously pointed out, the apparatus discussed with reference to Figs. 1 through 4 is readily adaptable for projection mounting. In such a case the outer perimetral portion 19 of the cover is separated from the central portion 18 by breaking along the weakened lines 21 and 21a. In such a case the perimetral portion of the central portion 18 fits into engagement with the inwardly extending front perimetral portion 26 of the receptacle as shown in Fig. 5. It will appear that this engagement between the two surfaces adequately prevents the entrance of any foreign matter between the cover and receptacle. The cover is retained in position by machine screws 23 in the manner previously described and the remainder of the apparatus which is not shown in Fig. 5 may be the same as that shown in the preceding figures. The automatically adjustable construction of the cover insures that the auxiliary cover 34 will assume the proper position relative to the breakers irrespective of whether flush or projection mounting is employed.

In Fig. 6, a cover which is otherwise similar to the cover 3 includes a central portion 18' which has a perimetral offset 55 about the inner edge of the surface thereof engaging the flange 26 of the receptacle 2. This offset will facilitate proper centering of the cover on the receptacle in the case of projection mounting.

Figs. 7 to 10 inclusive illustrate a modified form of receptacle which is suitable for either flush or projection mounting and may be otherwise employed in the same manner as the apparatus previous described. This apparatus comprising a receptacle 58 having its front inwardly offset to form a perimetral shoulder portion 59 and a forwardly extending flange designated as 60 defining the opening therein. Four channel members designated as 62 are designed to fit about the front of the receptacle with one side engaging the shoulder 59 and the open portion extending toward the flange 60. Each of these channels is adapted to extend along one of the four sides of the receptacle and they may be cut at 45 degrees at their ends as shown at 62a to form mitre joints. As shown by way of example in the drawings, machine screws 63 extend through spaced openings in the lower arms of the channels to engage corresponding screw threaded holes in the shoulder 59 for releasably securing the channel members in place. The upper arms of these members may be apertured at 64 to permit manipulation of the screws 63. With the channel members in place as shown in Figs. 7 and 8 a cover 3 similar to that previously described but without the outer perimetral portion 19 may be secured to the receptacle as by means of machine screws 66 extending into threaded engagement with holes in angle brackets 67 secured to the receptacle in spaced relationship about the opening therein. The perimetral portion of the cover thus engages the flat upper arms of the channel members to prevent the entrance of foreign material.

By removing the four channel members 62 as shown in Figs. 9 and 10 the above described receptacle is readily adapted for a flush mounting installation with a wall surface 70 extending within the perimetral space formed between the front offset portion of the receptacle and the cover 3.

Figure 14:
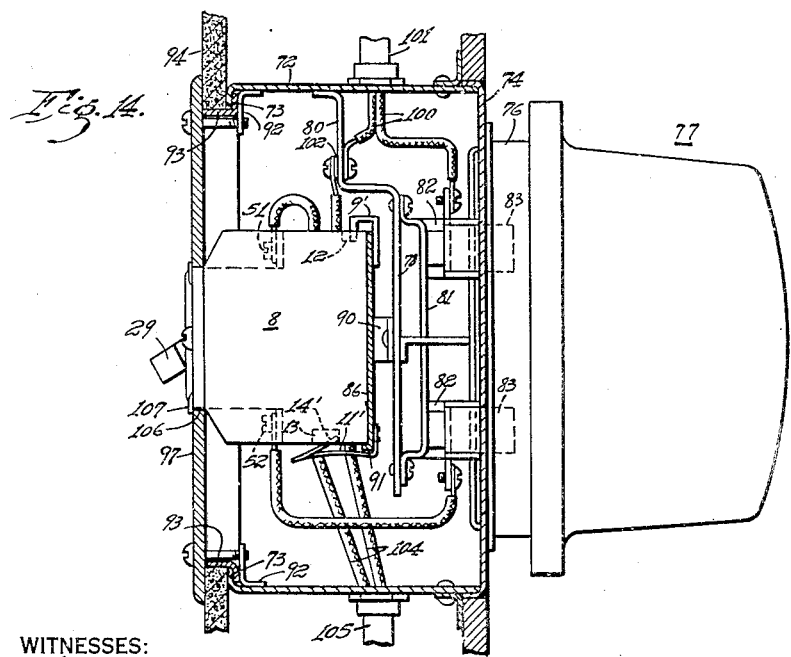
Fig. 14 is a view, partly in vertical section along the line XIV—XIV of Fig. 13 and partly in elevation of the apparatus of Fig. 13.

Figs. 13 through 18 show a modified construction for a receptacle suitable for either flush or projection mounting and in addition illustrate a modified cover which may be substituted for the preferred cover previously described. Figs. 13 through 15 show this modified form of the invention applied to a service receptacle of the type described and claimed in Patent 2,323,252, issued June 29, 1943, to Harry P. Sparkes. In the present apparatus a receptacle 72 has an open front with perimetral edges or flanges turned inwardly about the opening as at 73. In addition the opposite side or rear of the receptacle is also open and designed to be closed by a rear cover 74 having an opening surrounded by a flange 76 for engaging the casing of a detachable meter 77 in a manner which will be clear to those skilled in the art and as described more fully in the aforementioned copending application.

Within the receptacle 72 is a dividing panel 78 having a forwardly offset portion 80 at its upper end and secured to the top and sides of the receptacle as by welding or the like. A U-shaped metal strap 81 is secured to this dividing panel to support insulating blocks 82 which, in turn, carry clamping jaws 83 for engaging the terminal blades of the detachable meter 77 in a manner described in the previously mentioned Sparkes application.

Also disposed within the receptacle 72 is a breaker supporting panel 86 which includes a main back portion and forwardly extending sides 87 which are best shown in Fig. 15. Attached to each of the side members 87 is a guide strap 88 which is arranged to slidably engage spaced angle bars 89 which project forwardly from the panel 86 to support the panel 86.

In order to secure a predetermined number of circuit breakers 8 from the panel 86, a plurality of individual clamping devices similar to those designated as 7 in Fig. 2 are employed. Each of these clamping devices includes a rigid upper finger 9' designed to fit into the upper notch 12 of the breaker and a lower resilient finger 11' having a sloping portion 14' for releasably engaging the lower notch 13. When a breaker is in attached postion its back is in engagement with the panel 86 as a base and its lower rear portion rests upon a stop member 91 extending from the panel 86 to furnish support thereto in a horizontal direction.

In Fig. 14, the receptacle is disposed within a wall in flush relationship thereto. Spaced supporting angle members designated as 92 are secured to the receptacle at a small distance from the inwardly turned front edges as by welding or the like. The spacing of these members from the front edge is for the purpose of permitting the insertion of angle members 93 about the rectangular opening in the receptacle. Thus a first side of each of these angle members fits between the edge 73 and the members 92 so as to have the other side thereof project forwardly from the front of the receptacle for engagement by a wall surface 94. Two of these angle members are oppositely disposed and are preferably provided with protuberant portions 96 adjacent their ends as shown in Fig. 17 so that the other two members will be clamped into assembled position between them in a readily detachable manner. The angles will ordinarily be of a somewhat yielding or resilient construction to permit them to be assembled on the receptacle in a convenient manner. A cover 97 is secured to the front of the receptacle into engagement with the wall 94 by machine screws 121 engaging screw threaded holes in certain of the angle clamps 92. As has been previously pointed out the supporting panel 86 is movable relative to the front of the receptacle. Thus the circuit breakers disposed thereon may be adjusted relative to the cover 97 by means of machine screws 98 extending therethrough into engagement with screw threaded holes in the brackets 87 which carry the panel.

In Fig. 14, a set of supply conductors 100 are shown extending into the receptacle 72 through a conduit 101. The ground conductor of this group is connected directly to a conducting strip 102 disposed on the opposite side of the panel 78 while the other conductors are electrically connected to the line terminals of the detachable meter in a usual manner. The load terminals of the meter are connected to the terminals 52 of the circuit breakers 8. Circuit conductors 104 extending into the receptacle through a conduit 105 are connected to the ground strip 102 and the terminal 51 of a breaker.

The modified form of cover designated as 97 is provided with an opening 106 which is of such a size as to permit the operating handles of the total number of breakers that the receptacle will accommodate to extend therethrough. By way of example, however, the receptacle is shown as adapted to hold six breakers while only four are actually installed. In order to close the opening completely about the breakers, panels designated generally as 107 are attached to the cover. As is best shown in Fig. 18, each of these panels comprises a main portion 108 having its top slit as shown to provide two forwardly extending fingers 110 and a central finger 111 which extends to the rear. The edge of the opening in the cover 97 thus may be fitted between these fingers. At its lower end, the strip 108 is bent forwardly as shown at 112 to engage the front of the lower edge of the cover 97. An auxiliary strip 114 is attached to the panel 108 adjacent its bottom end by means of a rivet 115 and is freely pivotal thereabout. The point of attachment by means of the rivet is located much closer to the upper end of the auxiliary strip than to the lower so that while the strip ordinarily extends against the back of a cover 97, it may be rotated 180° to permit ready removal of the device 107 when it is desired to add another breaker to the installation.

In Fig. 16, a receptacle 120 having a front similar to that of the receptacle 72 is shown with the angle members 93 removed to adapt it for a projection mounted installation. Circuit breakers 8 are shown detachably mounted on a supporting panel 86 by fingers 9' and 11' extending into notches 12 and 13 respectively. The cover 97 is secured to the receptacle in engagement with the inturned flanges 73 thereof by machine screws 121 threaded into openings in the angle supports 92. Conductors 122 extend into the receptacle through a conduit 123 to engage conducting fingers 43 of a connector similar to that shown in Figs. 11 and 12 and a ground strip 44.

It will readily appear from the foregoing that the convertible receptacle front structure of Figs. 13 through 17 permits a convenient adaptation of a receptacle for either flush or projection mounting by either using or removing the angle members 93. While the adjustable supporting panel 86 permits adjustment of the location of the breakers to either type of mounting it will also appear that the substitution of the self-adjusting cover of Figs. 1 through 4 will make the use of such a panel unnecessary in many cases.

Various advantages of the invention will be evident from the foregoing description. The convertible receptacle arrangements permit the equipment to be sold in kit form suitable for either type of mounting. The other features of the invention contribute to provide a compact structure which is readily adaptable to accommodate changes in service requirements.

Since various modifications of the apparatus shown and described by way of example will appear to those skilled in the art, it is intended that the invention shall be limited only by the spirit and scope of the appended claims.

We claim as our invention:

1. In combination, an open front receptacle, an electrical device having operating means, means for securing said device in said receptacle with its operating means facing the open front thereof, a main cover for said receptacle having an opening in alignment with said operating means to afford access thereto, an auxiliary cover member having an opening designed to engage the front of said device about its operating means, and means for movably supporting said auxiliary cover member in resilient bias against said electrical device including a spring member reacting between said covers to bias them apart.

2. In combination, an open front receptacle, an electrical device having operating means, means for securing said device in said receptacle with its operating means facing the open front thereof, a main cover and means for securing it to said receptacle, said cover having a central opening and an inwardly extending flange disposed thereabout, an auxiliary cover member having an opening the perimetral edge of which is designed to engage the front of said device about its operating means, an outwardly extending perimetral flange extending about the inwardly extending flange of said main cover in telescopic relation, and means for movably supporting said auxiliary cover member in resiliently biased relationship against said device.

3. In a mounting for an electrical control device having opposed notches in its top and bottom surfaces, a base, a first clamping finger of substantially rigid construction supported from said base and designed to fit within one of said notches to permit pivotal movement of the device thereabout, a second finger of resilient construction supported from said base and having a forwardly and outwardly sloping portion designed to slide into the other said notch in response to pivotal movement of said device into a predetermined attached position, and means for engaging said device adjacent said flexible finger when in said attached position to secure it against said rigid finger.

4. In a mounting for a plurality of electrical control devices each having upper and lower terminals and upper and lower attaching notches in its top and bottom respectively at its rear, a base member, a first group of substantially rigid clamping fingers supported from said base member in side-by-side relationship and designed to fit into the upper notches of said devices to permit pivotal movement of the corresponding device thereabout, a second group of fingers of resilient construction supported in side-by-side relationship from said base member for readily attachable and detachable engagement with the lower notches in said devices in response to a pivotal movement into position about the corresponding rigid finger, and a contact member including a main interconnecting strip and a plurality of resilient fingers extending substantially perpendicularly therefrom, said fingers being disposed to extend normally to positions for engagement with the upper terminals of said devices when in attached position but being deformable therefrom to permit insertion or removal of the devices individually.

ERNEST G. JOHANSSON.
ARTHUR A. YOUNG.